Sept. 1, 1931.  E. HOLEK  1,821,385

CHARGING DEVICE FOR FIREARMS

Filed June 18, 1929  4 Sheets-Sheet 1

Emanuel Holek
INVENTOR

BY *[signature]* his ATTORNEY

Sept. 1, 1931.  E. HOLEK  1,821,385
CHARGING DEVICE FOR FIREARMS
Filed June 18, 1929   4 Sheets-Sheet 2
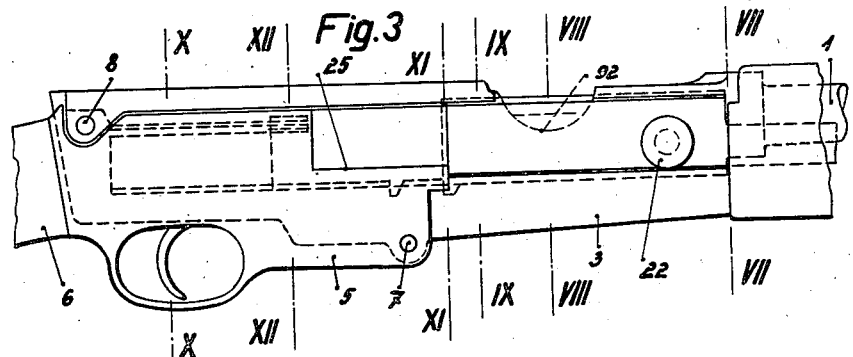
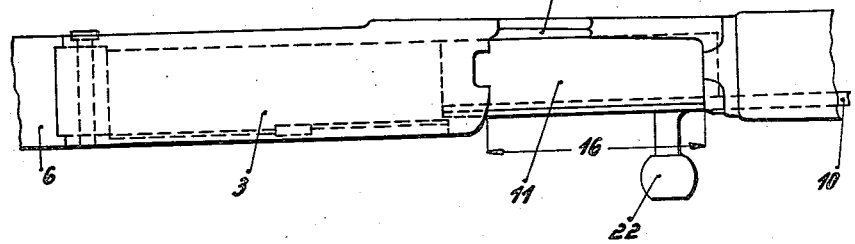
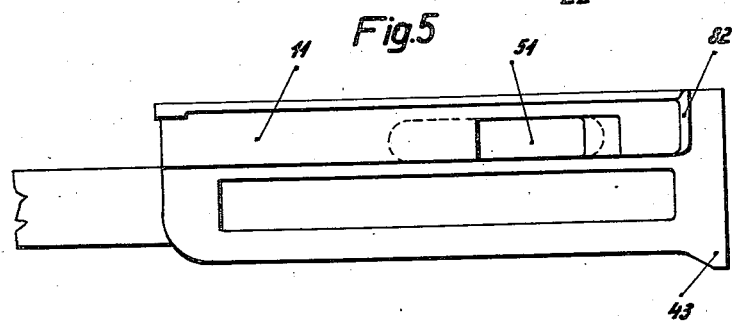
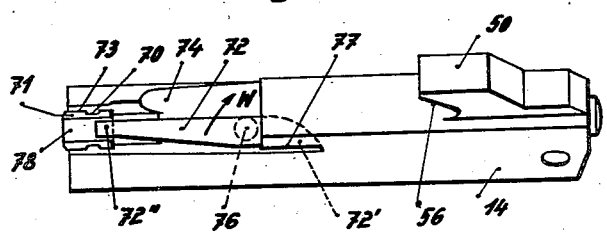
Emanuel Holek
INVENTOR
BY
his ATTORNEY Sept. 1, 1931. E. HOLEK 1,821,385
CHARGING DEVICE FOR FIREARMS
Filed June 18, 1929 4 Sheets-Sheet 3
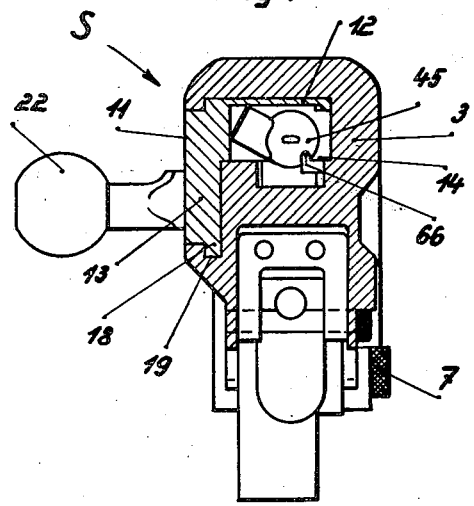
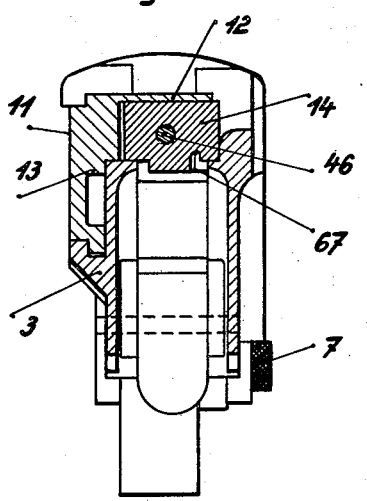
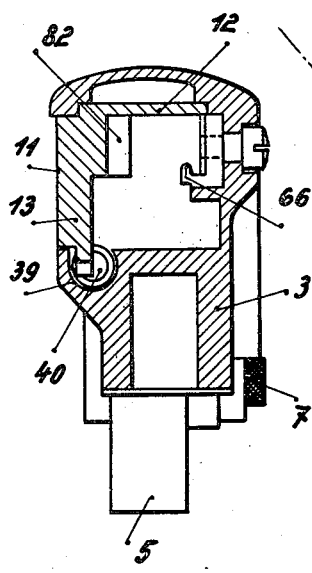
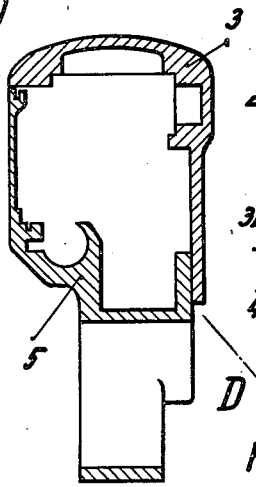
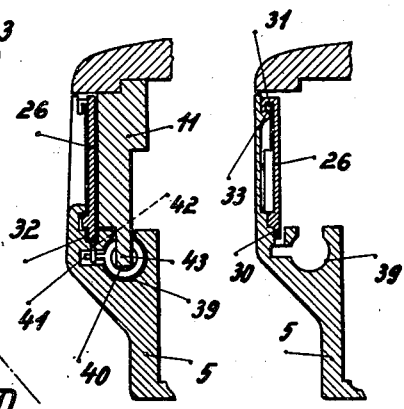
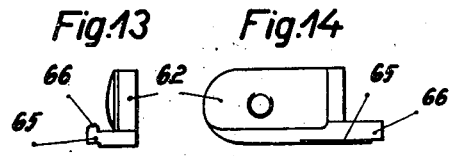
Emanuel Holek
INVENTOR
BY
his ATTORNEY

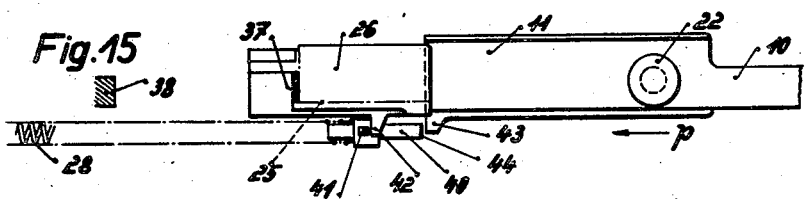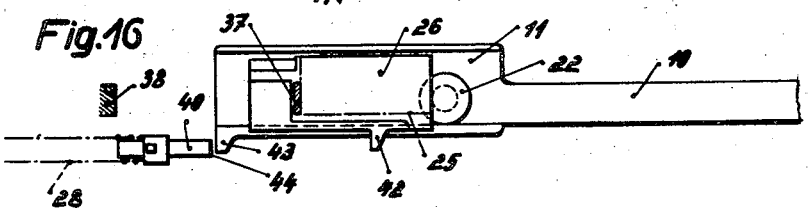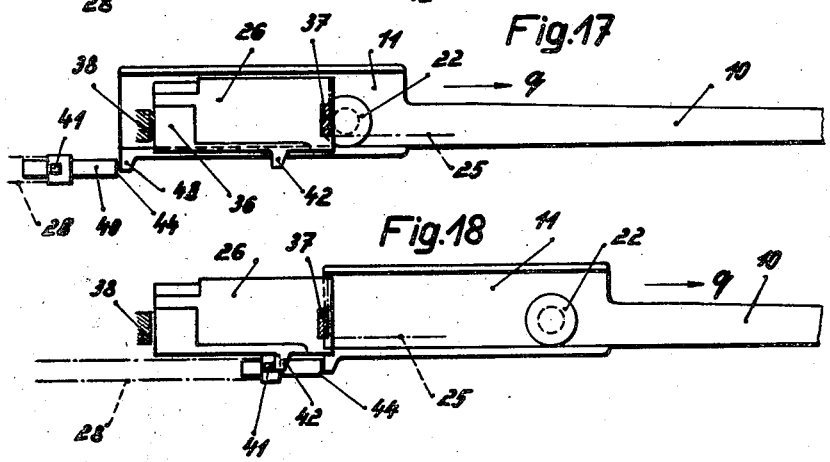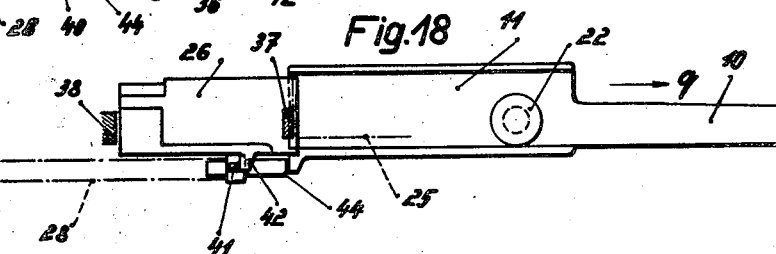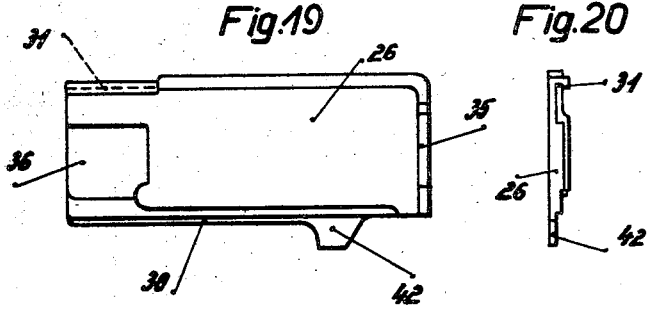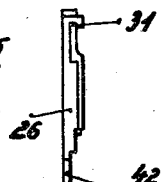

Patented Sept. 1, 1931

1,821,385

UNITED STATES PATENT OFFICE

EMANUEL HOLEK, OF BRUNN, CZECHOSLOVAKIA, ASSIGNOR TO THE FIRM CESKOSLOVENSKA ZBROJOVKA AKCIOVA SPOLECNOST V BRNE, OF BRUNN, CZECHOSLOVAKIA

CHARGING DEVICE FOR FIREARMS

Application filed June 18, 1929, Serial No. 371,788, and in Czechoslovakia May 14, 1929.

This invention relates to gas-pressure operated charging devices for automatic fire-arms and has for its object primarily to provide a charging device of this kind which is of relatively small weight and therefore especially well adapted for portable fire-arms, such as for instance automatically operated small-arms, rifles and the like. A special feature of the gas-pressure operated charging device according to my present invention consists in the fact that the piston-rod in the cylinder of the gas-pressure operated charging device is constructed at its rear end in such a manner that it will form a carrier for the breech and constitute at the same time a closing organ for the aperture which serves for ejecting the empty cartridge cases and for supplying the charged cartridges to said fire-arm. Preferably the breech-carrier which is made integral with the gas-pressure piston and the piston-rod associated therewith is constructed in the form of an angular member enclosing the breech as well as the parts mounted thereon, such as the cartridge extracting device, the control organs for the breech and the like. In addition to this, according to my invention, the breech-carrier is constructed to properly fit the breech-casing so as to safely close-up the most important members of the fire-arm.

Figure 1:
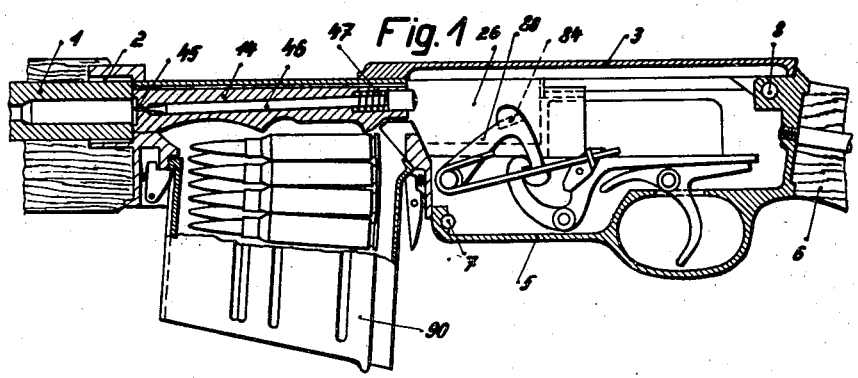
Figure 2:
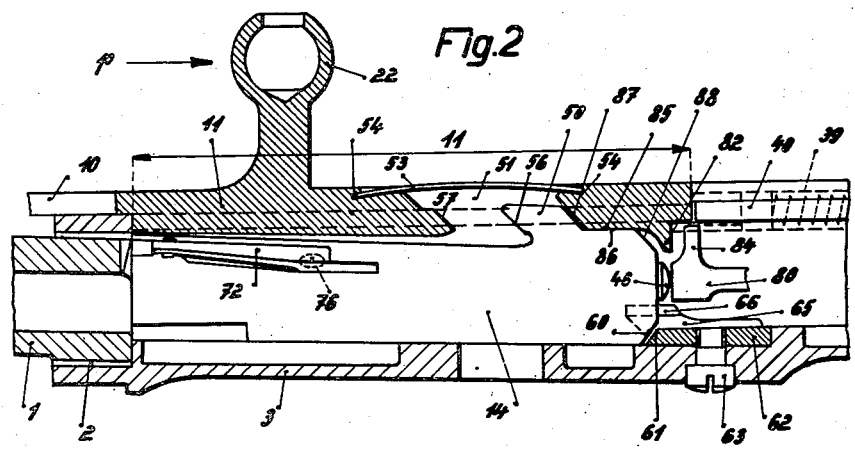
Figure 2A:
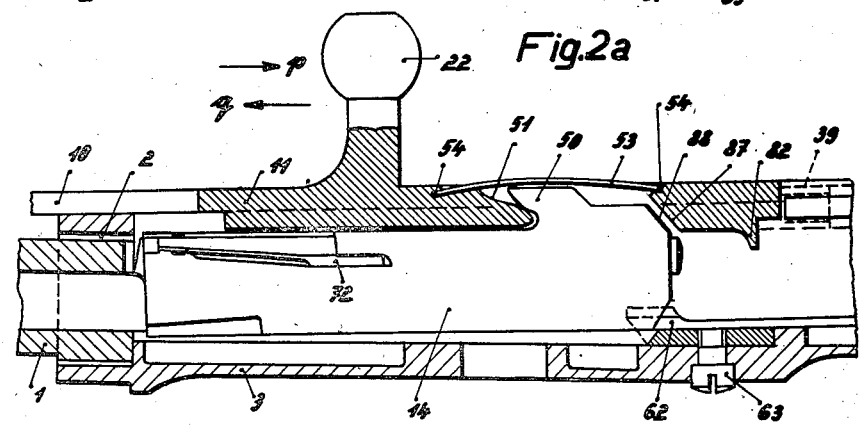

In the accompanying drawings I have shown an embodiment of my invention in the form of an automatic fire-arm which is equipped with a gas-pressure operated charging device constructed according to my invention. Fig. 1 is a longitudinal section showing the central part of an automatic fire-arm constructed in accordance with my invention, Figs. 2 and 2a are longitudinal views, partly in section, showing especially the mode of operation of the breech-carrier and the breech during tensioning the latter in two characteristic positions thereof, Fig. 3 a side elevational view of the central part of the fire-arm, Fig. 4 is a top plan view on Fig. 3, Fig. 5 is a detail view showing the breech-carrier, and Fig. 6 is a top plan view of the breech, said view being taken in the direction of the arrow S (Fig. 7). Figs. 7, 8, 9, 10, 11 and 12 are enlarged sections along the lines VII—VII, VIII—VIII, IX—IX, X—X, XI—XI and XII—XII, respectively, of Fig. 3, and Figs. 13 and 14 are detail views of the cartridge-ejector. Figs. 15, 16, 17 and 18 illustrate the mode of co-operation of the breech-carrier with the cover and the actuating spring in four special positions, Fig. 19 is an elevational view of the cover, and Fig. 20 is a side elevational view on the latter, as seen from the left-hand side. Figures 1a and 1b are detail views of the locking plate.

Referring to the drawings, 1 denotes a barrel fixed within an extension of a breech-casing 3 by means of a thread 2. The lock-casing is indicated at 5. The breech-casing 3 is pivotally connected with the lock-casing 5 by means of a bolt 7, in such a manner that the breech-casing together with the barrel and associated parts which are mounted within the breech-casing and the lock casing 5 together with the stock 6 may be swung relatively to each other around said bolt 7 after releasing a locking bolt 8.

Referring to Fig. 10 it will be seen that the lock-casing 5 and the breech-casing 3 are of such a construction that the entire casing formed thereby is divided in diagonal direction D—D. In other words, the lock-casing 5 and the breech-casing 3 are each of angular cross-section supplementing each other after being put together to form a casing closed all around. By so constructing the breech-casing and the lock-casing in accordance with my invention, I obtain an advantage which provides that after releasing the locking bolt 8 and swinging said two casings 3 and 5 around the bolt 7 the parts arranged in the interior of said casings will be rendered readily accessible.

The piston-rod 10 which leads from the gas-piston (not shown in detail in the drawings) towards the rear is constructed at its rear end to form a carrier 11 for the breech 14. This rear part 11 of the piston-rod 10 is of angular cross-sectional conformation as shown in Figs. 7–9, one wall of the angle being designated 12 and the other 13. The breech-carrier, as Fig. 4 shows, 1( further forms a closure for the ejecting and charging apertures 16 and 17 of the breech casing 3. The breech 14 more particularly, is so arranged within the breech-carrier that it will be enclosed on both sides by means of the aforementioned walls 12 and 13 of which the rear part 11 of the piston-rod is composed. The breech 14, therefore, will be positioned within the angular space formed by the walls 12 and 13 of the rear part of the piston-rod and in this manner will be most effectively protected towards the outside. The breech-carrier 11 is slidably mounted displaceably in grooves 18 in the casing 3 by means of guide-ledges 19 forming an integral part of the breech-carrier 11, as shown in Fig. 7. The breech-carrier 11 is further equipped with the usual handle or knob 22 which serves for tensioning the breech by hand. In order to permit said knob 22 to be fully retracted, the lock-casing 5 is provided with a recess 25, a cover 26 being positioned within the range of action of said recess 25 to close the opening in which knob 22 moves. Normally, the cover 26 will close up the recess 25 and motion of said cover is controlled by the breech-carrier 11 and by an actuating spring 28. Said cover which is of a conformation as indicated in Fig. 19 is provided with a guide-ledge 30 and a guide-groove 31 and is displaceably mounted by means of said guide-ledge and guide-groove on the interior surface of the lateral wall of the lock-casing 5. A further guide-groove 32 is provided for this purpose for said guide-ledge 30 and a further guide-ledge 33 for said guide-groove 31, both on the interior surface of the lock-casing 5. On either of its ends the cover 26 carries stops 35 and 36 which co-operate with further stops 37 and 38 on the interior surface of the lock-casing 5, the stop 36 being constructed essentially stronger than the other stop 35 as hereinafter described.

The breech-carrier 11 as well as the cover 26 co-operate with the actuating spring 28 and more particularly through the intermediary of a special member 40 which serves as a support for the one end of said actuating spring 28. This intermediate member 40 is of the form of a bolt or piston, displaceably guided within a cylindrical guide 39 on the breech-casing 5 and equipped with a nose 41 co-operating with a nose or stop 42 on the cover 26. The breech-carrier 11 is likewise provided with a nose 43 with which the front end 44 of the spring-actuated bolt may come in contact.

The breech 14 swings in a horizontal plane below the horizontally positioned wall 12 of the breech-carrier. At the front side of the breech 14 there is a recess 45 adapted to receive the bottom of the cartridge within the barrel. The priming bolt 46 is actuated by a spring 47. The breech is equipped with a nose 50 which engages with a recess 51 in the breech-carrier, said recess consisting of a slot passing through the wall 13, as may be seen from Fig. 5. The slot 51 is covered up towards the outside by a cover plate 53 which consists of a leaf-spring which at its ends engages with notches 54 in the carrier 11 thus being kept in closed position. The nose 50 is provided with an oblique control-surface 56 which co-operates with a similar oblique surface 57 of the slot 51 in the breech-carrier. The oblique surfaces 56 and 57 serve to move the breech 14 during motion of the breech-carrier in the direction of the arrow $p$ towards the latter to unlock the breech 14. In order to lock the breech, the latter is provided with a locking surface 60 positioned opposite to the nose 50, said locking surface 60 co-operating with a further rigid locking surface 61. This rigid locking surface 61 is formed on a plate 62 which is fixed by means of a screw 63 upon the interior side of the breech-casing 3. The plate 62 is equipped with a boss 65 which carries the cartridge ejector 66. The breech is further provided with a groove 67 permitting passage of the cartridge-ejector 66 therethrough, said groove 67 extending through the recess 45 which serves for the reception of the cartridge at the bottom thereof.

The cartridge-extractor which is provided at the breech consists of a pawl 71 which is slidably mounted within its guides 70 in a direction towards and away from the longitudinal axis of the breech, said pawl 71 being normally kept in extracting position by action of a spring 72. The cartridge-extractor is further mounted within recesses 73 and 74 of the breech 40 in such a way that no part of said cartridge-extractor will project beyond the surrounding surfaces of the breech. In the present case the cartridge extractor is arranged within that part of the breech which is covered up by the walls 12 and 13 of the breech-carrier. Due to the aforedescribed counter-sunk arrangement of the cartridge-extractor it will be possible to so arrange the breech 14 within the corner formed by the walls 12 or 14 of the breech-carrier as shown in Fig. 8 so that the upper wall 12 forms a guide for the breech, without, however, in any way interfering with the function of the cartridge-extractor. The actuating spring 72 for the pawl 71 consists of a leaf-spring which carries a pin 76 positioned within a properly formed cylindrical recess in the breech 14, the spring 72 being mounted so as to be able to rotate in the direction of the arrow $w$. The one end 72' of the spring 72 is anchored within the slot 77 in the breech, while the freely resilient end 72" of said spring 72 extends into a groove 78 on the body of the pawl 71. The aforedescribed mode of anchoring the spring 72 permits easy mounting and dismounting of the cartridge-extractor without the use of any kind of tool.

The gas-pressure operated charging device according to my invention is furthermore provided with a safety-device which warrants actuation of the priming bolt 46 by the hammer 80 only in a definite relative position of the breech-carrier. The said safety-device consists of a stop 82 mounted upon the breech-carrier 11, said stop having in the example shown herein the conformation of a nose. This nose 82 is so arranged that in locked condition of the breech (Fig. 2) said nose will be positioned laterally of the priming bolt. The hammer 80 carries a stop 84 which engages nose 82 and serves for interrupting forward motion of said hammer 80 in case the breech-carrier 11 is not fully in its front position, before the hammer 80 acts upon the priming bolt 46.

In locked position of the breech the several parts of the gas-pressure operated charging device will assume a position as shown in Fig. 2. The breech 14 is in a position swung away from the breech-carrier 11 and locked in this position by means of the locking surfaces 60 and 61. The breech will be safely kept locked due to contact of the surface 85 with the surface 86. If now the knob 22 is moved by hand in the direction shown by the arrow in Fig. 2, simultaneously therewith the breech-carrier will be moved in this direction. After the nose 43 has engaged with the bolt 40, the latter likewise moves towards the rear, thus tensioning the the spring 28. In this condition displacement of the cover 26 in rearward direction will be impossible and the cover will remain in position to close up the recess 25, until the knob 22 abuts against the cover 26, as shown in Fig. 16. Upon further backward motion of the breech-carrier 11 the two locking surfaces 85 and 86 are disengaged from each other and the oblique control surface 57 on the breech-carrier now abuts against the oblique control surface 56 on the breech 14, thus causing swinging of the breech 14 in direction towards the breech-carrier 11 as shown in Fig. 2a. On account of this swinging motion of the breech the two locking surfaces 60 and 61 will be disengaged from each other as shown in Fig. 2a. Now the breach 14 may be carried with the breech-carrier 11 and slide towards the rear without any obstruction. If the knob 22 abuts against the cover 26, the latter is thrown back until the stop 36 on said cover abuts against the fixed stop 38 as shown in Fig. 17. In this position the breech-carrier together with the breech is in fully retracted position and the actuating spring 26 is fully tensioned. During the aforementioned retracting motion of the breech-carrier as far as to that position in which the stops 36 and 38 will abut against each other, the hammer 80, which forms part of the firing mechanism, will be tensioned by the breech and said mechanism as a whole will be ready for firing.

If now the knob 22 is released, the breech-carrier 11 under the action of the tensioned actuating spring 28 moves towards the front in the direction of the arrow $q$. The cover 26 at present remains in retracted position. Upon further motion of the breech-carrier 11 in the direction of the arrow $q$ the pin 41, as shown in Fig. 18, abuts against the nose 42 of the cover 26 and from this moment on the cover 26 will be positively moved by action of the tensioned spring 28 from the position shown in Fig. 18 into its initial position shown in Fig. 15.

It will be apparent that the recess 25 in the locking-case 5 due to the aforedescribed mode of operation is at first covered up by the cover 26 and subsequent thereto by the wall 13 of the breech-carrier 11 and finally said recess is again covered up by said cover 26. During forward motion of the breech-carrier 11 the uppermost cartridge contained in the magazine 19 will be gripped by the breech and inserted into the barrel 1. If the breech 14 and the breech-carrier 11 have finally come into the position shown in Fig. 2a, the two oblique surfaces 87 and 88 upon further motion of the breech-carrier 11 in the direction $q$ will effect swinging of the breech 14 which will yet commence to be supported at the rearward end of the barrel, said swinging taking place in the direction away from the breech-carrier 11 until the breech 14 has come into locking condition as indicated in Fig. 2. The breech-carrier 11 now will slide with its surface 85 above the surface 86, thus keeping the breech 14 in locked position as shown in Fig. 2.

The fire-arm is now in condition ready for firing. After firing, the gases which act in well-known manner upon the piston of the charging device will cause the breech-carrier to be thrown back in the direction of the arrow $q$ and now the above-described operation of the several parts of the gas-pressure operated charging device will repeat itself. The cartridge-extractor 71 extracts the empty cartridges and the cartridge-ejector 66 now abuts against the bottom of a cartridge which will then be ejected through the aperture 16 which has been opened by the breech-carrier. Motion of the breech-carrier 11 while being thrown back is limited by the stops 36 and 38 shown in Fig. 17. Since in the present case relatively large live forces have to be counteracted, these forces being due to the relatively large masses of the breech-carrier and the breech being thrown backward, the stop 36 of the cover 26 is made essentially of greater strength than the stop 35 as above indicated.

By providing a breech which swings in an horizontal plane and by constructing the breech-carrier 11 in the aforedescribed manner to serve as an organ covering up the ejecting and charging aperture 16, it will be rendered possible to provide a recess for the thumb at the breech-casing 3 permitting convenient charging of the fire-arm with cartridges from a feed-strip or the like.

The aforedescribed gas-pressure operated charging device which forms part of my present invention is distinguished in particular from known constructions of this kind, in that it is possessed of great simplicity, in that it consists of a relatively small number of parts and in that the breech will be well closed and in unlocked position safely protected against intrusion of foreign matter. Also my present charging device is distinguished by great reliability of operation. A further advantage of present gas-pressure operated charging device consists of the small weight and in the extremely rugged construction so that it may especially be used with light portable fire-arms.

The gas-pressure operated charging device forming part of my present invention as described herein and shown in the drawings represents only an example of a construction according to my invention. Various changes may be made on the constructions herein described without departing from the principles of my invention or sacrificing any advantages thereof.

I claim:

1. In combination with the breech of a fire-arm, a gas-pressure operated charging device having a breech casing provided with an ejecting and charging aperture and comprising a gas-cylinder, a piston and a piston-rod therefor, the trailing portion of said piston-rod being disposed to carry said breech within the breech casing and having portions to move into postion to close the ejecting and charging aperture.

2. In a gas-pressure operated charging device for fire-arms as specified by claim 1, the provision of a breech-carrier composed of two walls positioned at an angle with each other to receive the breech intermediate said walls, one of said walls being adapted to form a closure for the ejecting and charging aperture of the fire-arm.

3. A gas-pressure operated charging device as specified by claim 1, in which the breech-carrier is provided with two walls arranged at an angle with respect to each other, said walls being positioned within the angle of said breech casing and forming a closure for the ejecting and charging opening for said casing, a guide for the breech, and control-organs for said breech, said control-organs being provided on one of the walls of said breech-carrier.

4. A gas-pressure operated charging device as specified by claim 1, in which the breech-carrier is provided with two walls arranged at an angle with respect to each other, said walls being positioned within the angle of said breech casing and forming a closure for the ejecting and charging opening for said casing, a guide for the breech, control-organs for said breech, said control-organs being provided on one of the walls of said breech-carrier, and a recess on the same wall of said breech-carrier, said recess having oblique control surfaces, a tooth on said breech, said tooth having oblique surfaces similar to said oblique control surfaces on said recess and adapted to co-operate therewith.

5. A gas-pressure operated charging device as specified by claim 1, in which the breech-carrier is provided with two walls arranged at an angle with respect to each other, said walls being positioned within the angle of said breech casing and forming a closure for the ejecting and charging opening for said casing, a guide for the breech, control-organs for said breech, said control-organs being provided on one of the walls of said breech-carrier, a recess on the same wall of said breech-carrier, said recess having oblique control surfaces, a tooth on said breech, said tooth having oblique surfaces similar to said oblique control surfaces on said recess and adapted to co-operate therewith, said recess consisting of a slot passing through one of the walls of the breech-carrier, and a cover for covering up said slot from the out-side.

6. A gas-pressure operated charging device as specified by claim 1, in which the breech-carrier is provided with two walls arranged at an angle with respect to each other, said walls being positioned within the angle of said breech casing and forming a closure for the ejecting and charging opening for said casing, a guide for the breech, control-organs for said breech, said control-organs being provided on one of the walls of said breech-carrier, a recess on the same wall of said breech-carrier, said recess having oblique control surfaces, a tooth on said breech, said tooth having oblique surfaces similar to said oblique control surfaces on said recess and adapted to co-operate therewith, said recess consisting of a slot passing through one of the walls of said breech-carrier, and a cover in the form of a leaf-spring adapted to cover-up said slot, the ends of said leaf-spring engaging with a notch in said breech-carrier.

7. A gas-pressure operated charging device as specified by claim 1 in combination with a fire-arm having the breech mounted swingably in a horizontal plane upon the breech-carrier.

8. In a fire-arm, the combination of a gas-pressure operated charging device as specified by claim 1, with a breech, a lock-casing, a cut-away portion on said lock-casing, a knob for cocking the fire-arm, arranged within range of the ejecting aperture of the breech casing, and a movable cover adapted to close up said cut-away portion, said locking casing having a slot closed by said movable cover and within range of motion of said knob.

9. In a fire-arm, the combination of a gas-pressure operated charging device, with a breech, a breech-carrier, a lock-casing, a knob for cocking said fire-arm arranged within range of the ejecting aperture of the breech casing, a cut-away portion on said lock-casing and a movable cover adapted to close up said cut-away portion, said movable cover consisting of a plate displaceably mounted in said lock-casing within the path of motion of said breech-carrier, said locking casing having a slot closed by said movable cover and within the range of motion of said knob.

10. In a fire-arm the combination of a gas-pressure operated charging device, with a breech, a breech-carrier, an actuating spring for said breech and breech-carrier, a lock-casing, a knob for cocking said fire-arm, a cut-away portion on said lock-casing, said cut-away portion being positioned within the range of action of said knob, a movable cover adapted to close up said cut-away portion, said movable cover consisting of a plate displaceably mounted in said lock-casing within the path of motion of said breech-carrier, and control-means for controlling motion of said cover to close up said cut-away portion during the last phase of cocking motion due to said knob, said control-means being operatively connected with said breech-carrier and further adapted to control motion of said cover to open said cut-away portion by the aid of said actuating spring.

11. A fire-arm as specified by claim 10, having stops fixed on the fire-arm, said stops being co-operative with further stops on the movable cover for limiting motion of the latter.

12. A fire-arm as specified by claim 10, having stops fixed relatively to the fire-arm, said stops adapted to co-operate with stops on the movable cover to limit motion of the latter, said former stops being mounted upon the lock-casing.

13. A fire-arm as specified by claim 9, having the breech-carrier and the movable cover connected with an actuating spring by means of a displaceably mounted intermediate member, said intermediate member consisting of a bolt guided within guide-means, and stops adapted to connect said bolt with the breech-carrier and the movable cover.

14. A fire-arm as specified by claim 9, having the breech-carrier and the movable cover connected with an actuating spring by means of a displaceably mounted intermediate member, said intermediate member consisting of a bolt guided within guide-means, and stops adapted to connect said bolt with the breech-carrier and the movable cover, said breech-carrier and said cover being equipped with noses adapted to engage with said bolt in the path of motion thereof, said bolt being co-operative with said actuating spring.

15. In a fire-arm, the combination of a gas-pressure operated charging device as specified by claim 1, with a breech, a lock-casing, a cut-away portion on said lock-casing, a knob for cocking the fire-arm, said cut-away portion being positioned within the range of action of said knob, a movable cover adapted to close up said cut-away portion, and locking means having a fixed member integral with a cartridge-ejector, said locking means together with said cartridge-ejector being exchangeably mounted upon said gas-pressure operated charging device.

16. In a fire-arm, the combination of a gas-pressure operated charging device as specified by claim 1, with a breech, a lock-casing, a cut-away portion on said lock-casing, a knob for cocking the fire-arm, said cut-away portion being positioned within the range of action of said knob, a movable cover adapted to close up said cut-away portion, locking means having a fixed member integral with a cartridge-ejector, said locking means together with said cartridge-ejector being exchangeably mounted upon said gas-pressure operated charging device, and a body provided with an oblique locking surface, said body being mounted upon said lock-casing, and a flap provided on said body, said flap adapted to carry said cartridge-ejector.

17. A fire-arm as specified by claim 10, having a cartridge-extractor mounted counter-sunk in a recess on the breech so that no part of said cartridge-ejector project beyond the surrounding surfaces of said breech, a hammer, a priming bolt associated therewith, the breech-carrier composed of two walls rectangular or essentially rectangular to each other, one of said walls being provided with a stop adapted to co-operate with a further stop on said hammer so as to lock said hammer in improper relative position of said breech-carrier and said breech, to prevent actuation of said priming bolt by said hammer.

18. A fire-arm as specified by claim 1, having a lock-casing and a casing for the breech, the latter being divided diagonally.

19. A fire-arm as specified by claim 1, having an angular lock-casing and an angular casing for the breech, the latter being divided diagonally.

20. A gas pressure operated charging device as claimed in claim 1, including a knob arranged on said breech carrier and disposed within range of the ejecting aperture In testimony whereof I affix my signature.

EMANUEL HOLEK.